United States Patent [19]
Sharkey, III et al.

[11] Patent Number: 5,197,228
[45] Date of Patent: Mar. 30, 1993

[54] METHOD OF AND MACHINE FOR GRINDING A WORKPIECE

[75] Inventors: John F. Sharkey, III, Camillus; Robert J. Buck, Holland Patent; Lawrence C. Baltazar, Schenectady, all of N.Y.

[73] Assignee: Constant Velocity Systems, Inc., Ballston Spa, N.Y.

[21] Appl. No.: 658,178

[22] Filed: Feb. 20, 1991

Related U.S. Application Data

[63] Continuation-in-part of Ser. No. 367,890, Jun. 19, 1989, abandoned.

[51] Int. Cl.$^5$ .............................................. B24B 49/00
[52] U.S. Cl. ............................. 51/165.71; 51/165.77; 51/165.93; 51/266
[58] Field of Search ......... 51/165 R, 101 R, 216 ND, 51/215 H, 266, 267, 272, 165.71, 165.77, 165.93

[56] References Cited

U.S. PATENT DOCUMENTS

| | | | |
|---|---|---|---|
| 3,693,297 | 9/1972 | Cann .................................. | 51/101 R |
| 4,312,155 | 1/1982 | Reda et al. ..................... | 51/216 ND |
| 4,330,966 | 5/1982 | Kadykowski ................. | 51/216 ND |
| 4,354,329 | 10/1982 | Ambrose .......................... | 51/215 H |
| 4,593,444 | 6/1986 | Kauthekar ............................ | 51/291 |

*Primary Examiner*—M. Rachuba
*Attorney, Agent, or Firm*—Howard J. Greenwald

[57] ABSTRACT

A method and a machine for grinding the components of a constant velocity universal joint of front wheel driven vehicles is disclosed wherein the method involves the grinding of the ball retaining grooves of the outer housing, inner race and outer race elements and the intermediate bearing retainer of the constant velocity universal joint to accommodate oversized replacement ball bearing. The machine is comprised of a rigid base, a component part holder movably supported to the base and moveable about an axis, a tool holder movably supported to the base and movable about at least on axis for accurately positioning a grinding tool within the grooves of the constant velocity joint members. The tool holder comprises a high speed grinding device, incremental adjustment means to accurately position the grooves of the members of the constant velocity universal joint in relationship to the grinding device, a rotatable arm to articulate the axial position of the constant velocity universal joint members and means to automatically control the predetermined patterns of movement of the tool holder according to the size and shape of a variety of contant velocity universal joints.

1 Claim, 9 Drawing Sheets

METHOD OF AND MACHINE FOR GRINDING A WORKPIECE

This is a continuation-in-part of U.S. patent application Ser. No. 07/367,890 filed Jun. 19, 1989, now abandoned and entitled Method of and Machine for Grinding a Workpiece.

FIELD OF INVENTION

The present invention relates to methods and mechanisms for grinding metal parts. More particularly, the invention relates to methods using mechanisms having cooperative workpiece holder and tool holder to form a grinding station at which a workpiece, such as a constant velocity universal joint of front wheel driven vehicles, is articulated through a predetermined pattern of grinding to precise dimensions. The present invention also relates to a means for remanufacturing the worn metal parts.

BACKGROUND OF INVENTION

The number of front wheel drive vehicles in the United States has grown from 6 million in 1975 to more than 30 million in 1987, and is expected to reach 84 million by 1995. All front wheel drive vehicles are equipped with constant velocity universal joints on the wheel axle. Constant velocity universal joints are disclosed in U.S. Pat. Nos. 4,177,654, 4,300,651, 4,476,950, and 4,634,402.

Constant velocity universal joints are susceptible to repair and replacement because of wear and tear through use and accident.

Use of the constant velocity universal joint causes the internal parts of the joint to wear and tear and eventually break down. The torque applied to the constant velocity universal joint is coupled from the output to the input through the ball bearings which attempt to move in a sideways direction, restrained by the grooves in the inner member and outer race member. Eventually friction between the ball bearing and the grooves, and deterioration of the parts caused by contaminants, begin to abrade the sides of the grooves. These factors allow for vertical and horizontal movement between the inner member and the outer enclosure and prohibit the free movement of the ball bearings forward and backward in the grooves. A break in the integrity of the protective rubber boot will often allow foreign particles into the grooves, increasing the rate of wear in the constant velocity universal joint. As mechanical play in the universal joint increases, vibration is induced in the operation of the vehicle. In severe cases of wear, an individual ball bearing may get caught in position, rather than freely rolling forward and backward as designed, resulting in joint seizure. Seizing of the constant velocity universal joint can cause damage to other components of the vehicle. Wearing of the internal components of the constant velocity universal joint eventually requires the replacement of the constant velocity universal joint. Complete replacement of the constant velocity universal joint is very expensive because of the cost of the precision machined components.

Moreover, a constant velocity universal joint is vulnerable to damage caused by loss of grease and/or intrusion of foreign materials into the protective rubber boot. If the rubber boot is ripped or pulls loose, the grease inside is quickly lost. The constant velocity universal joint can also be contaminated by dirt and water. Both occurrences result in the destruction of the internal components.

To remanufacture a worn or damaged constant velocity universal joint, it is known to grind the constant velocity universal joint components with surface grinding machines and rebuild the constant velocity universal joint with the ground components. A machinist manually works the individual machineable parts of the constant velocity universal joint, i.e. outer enclosure, grooves of the race members, and cage, by grinding with several different types of surface grinders and intermittently monitoring the diameter and/or other dimensions of the individual components. Monitoring of the grinding of the parts allows the machinist to change the mode of grinding if the monitored dimension deviates from a desired or optimum value. As a rule, the accuracy of the monitoring, and the grinding, depends upon the ability of the individual machinist operating the grinding machine to control the grinding machine. This manual grinding results in remanufactured constant velocity universal joint components whose dimensions may deviate from a desired value. This fact creates the need for large inventories of replacement parts, such as ball bearings of various sizes needed to compensate for and match the variations in the ground components, to insure the proper fit and operation of the reassembled constant velocity joint.

This method is prohibitively expensive and not often used, because it requires several different types of grinding machines, requires a skilled machinist with a thorough knowledge of constant velocity universal joints, and requires an extensive inventory of replacement parts of a variety of sizes.

It is also known to rebuild a constant velocity universal joint by replacing the worn or damaged parts and the protective rubber boot with a new boot and either new or salvaged internal replacement components. Usually the variations in internal dimensions which occurs in the original manufacture of the constant velocity universal joint, and is compensated for by the use of ball bearings of different sizes, is ignored during the rebuilding process. This results in either a tight fit or a loose fit between internal components of the constant velocity universal joint. Either case will usually cause premature wear or failure of the rebuilt constant velocity universal joint. An unacceptable high rate of premature wear or failure of constant velocity universal joints rebuilt using this method has caused the method to be expensive for the rebuilder and regarded poorly by automotive service agencies.

SUMMARY OF INVENTION

The present grinding machine comprises a tool holder and a workpiece holder, each moveable in relation to one another, and a reference center of rotation to define a grinding station; the workpiece holder having means for receiving, holding and rotating a workpiece through a predetermined pattern so that successive grooves in the workpieces are ground at the grinding station by a tool means which is mounted on the tool holder. The tool holder includes means for receiving a grinding head. A control means is included for conveying and coordinating the predetermined patterns of regulated movement of the workpiece holder and tool holder during the grinding process. The cooperative regulated movements of the workpiece holder and tool holder of the grinding machine enables the workpiece to be precisely ground without the need for monitoring the dimension of the grinding. Such precision grinding is important when the workpiece is a product such as a constant velocity universal joint having multiple members which need to be ground to accurate tolerances and specifications to allow for rebuilding and reuse.

The present invention has been designed to address the problems faced by mechanics in the field as they try to remanufacture worn constant velocity universal joints. This invention addresses the need to be able to regrind all three components of a universal joint to a specific tolerance. Moreover, this invention accomplishes regrinding at a single station with the aid of specially designed adapters which allow the workpiece holder to accommodate the various components.

Additionally, through the compilation of an extensive database, the machine of this invention can accommodate constant velocity joints of various configurations. A microprocessor is used in conjunction with a database of the various manufacturing specification in order to design a regrinding program which meets the needs of the various components of the varying constant velocity universal joints on the market.

It is, therefore, an object of the present invention to provide a machine for grinding worn constant velocity joint components to within manufacturers' tolerances or better, wherein the original ball bearings may be replaced by oversized ball bearings of a common size for a particular type and size constant velocity joint.

A further object of the invention is to provide a machine for grinding the individual components of a constant velocity universal joint which ensures precision grinding by cooperative movement of a workpiece holder and tool holder through a predetermined and controlled pattern of positions without monitoring the dimensions of the component being ground.

It is an object of the present invention to provide a machine which grinds worn or damaged constant velocity universal joints to improved tolerances between the balls and the inner and outer races.

Another object of the present invention is to provide a grinding machine with a novel and improved arrangement of workpiece holder and tool holder which are capable of rotating various types and sizes of constant velocity universal joints through predetermined patterns of movements to accomplish precision grinding of various individual components.

Another object of this invention is to provide a machine which automatically performs the operations necessary to accommodate precision grinding of the individual components of various types and sizes of constant velocity universal joints.

Yet still another object of this invention is to provide a single station machine which can perform multiple operations on workpieces of various types and sizes, with the aid of specially designed adapters.

Further objects and advantages of the present invention will be apparent from the following description and appended claims, reference being made to the accompanying drawings forming a part of this specification, wherein like characters designate corresponding parts in several views.

DETAILED DESCRIPTION OF THE DRAWINGS

Figure 1:
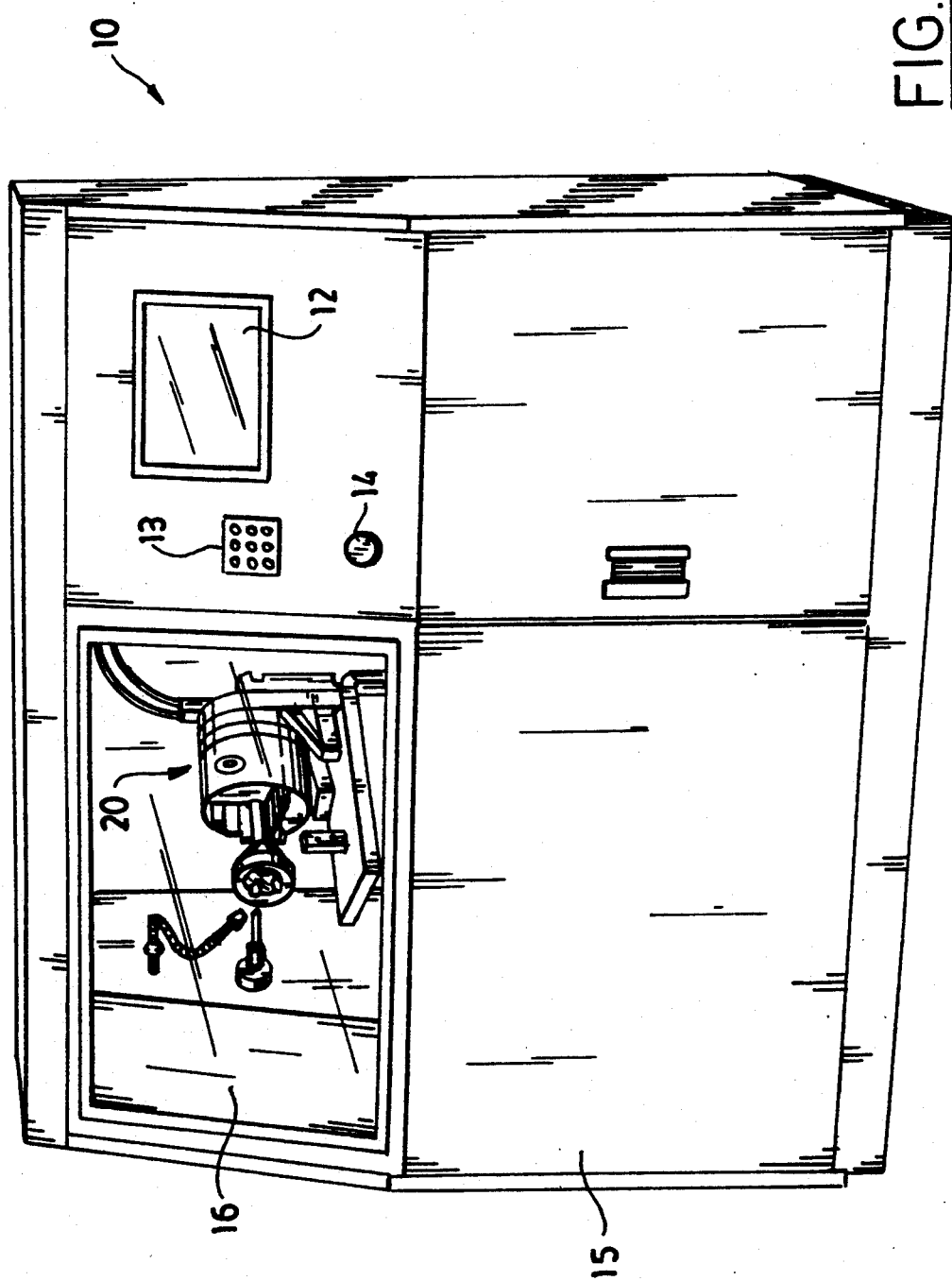
FIG. 1 is a representational perspective view of the grinding machine assembly.

FIG. 1 is a schematic of grinding machine assembly 10, which includes grinding machine 20 and microprocessor controller 11. In the preferred embodiment the grinding machine and the microprocessor controller are maintained within cabinet 15. Within the cabinet, the grinding machine is partially enclosed by lubricating protecting enclosure 16 which contains the lubricating medium from the outside environment as it is sprayed onto the workpiece and the workpiece table.

Other features added to the grinding machine built according to the present invention include a hose and nozzle arrangement to permit the user to wash grinding residues from the surfaces of the machine to be carried into a plastic recycling reservoir where the residues are attracted to a magnet for later disposal.

The microprocessor controller retrieves data about the particular joint being ground from a database in a micro floppy disk.

Monitor 12 displays and requests information from the grinding machine operator regarding the particular workpiece which is to be ground. The grinding machine operator inputs information through keypad 13. The information is processed by the microprocessor which results in the appropriate grinding sequence being initiated.

Emergency stop button 14 is also incorporated into the cabinet in the preferred embodiment. When depressed the emergency stop button immediately removes the electricity and the air pressure from all the components of the grinding machine assembly. The emergency stop button is incorporated within a panel of switchgear which provides electricity for the electronic components which serve to supply energy to the electrically operated parts of the grinding machine 20, and assorted hydraulic and/or pneumatic components which are needed in the grinding machine 20.

Figure 2:
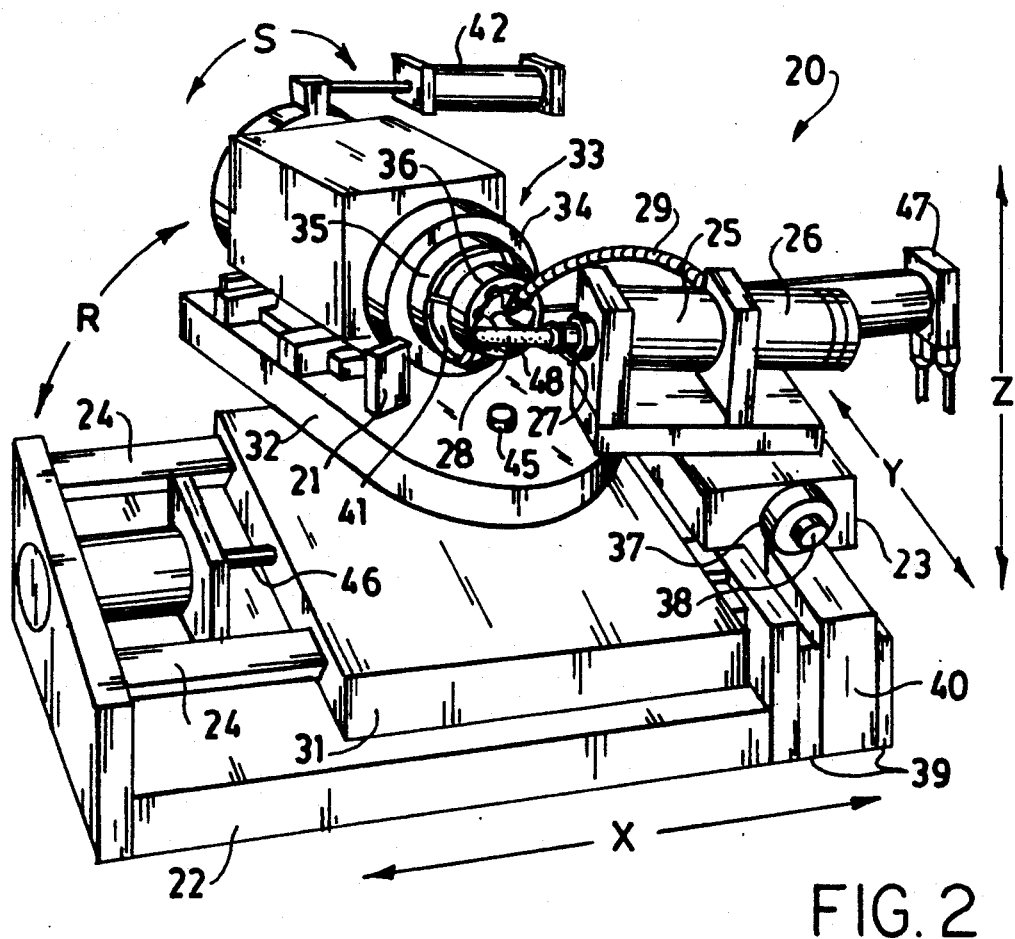
FIG. 2 is a perspective view of the grinding machine table which is constructed according to the teaching of the present invention.
Figure 3:
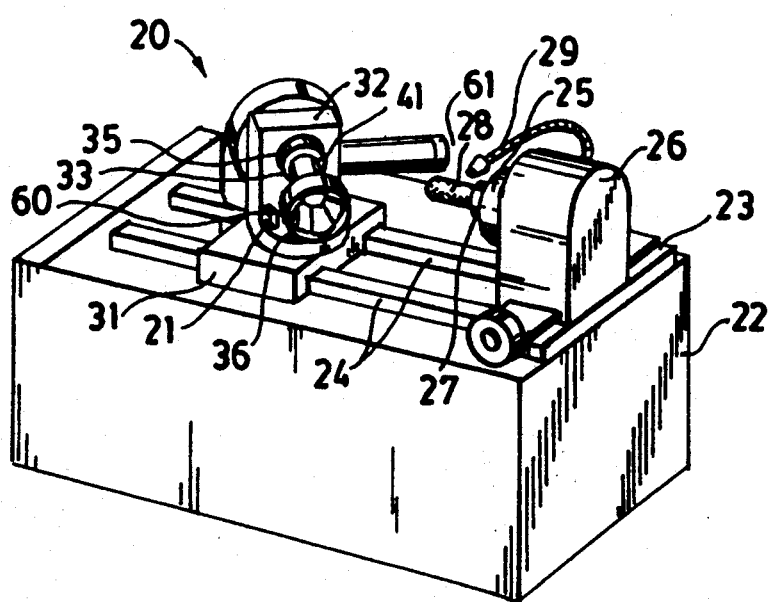
FIG. 3 is a perspective view of the grinding machine work station shown in FIG. 2.

FIGS. 2 and 3, show perspective views of a constant velocity joint grinding machine 20. The grinding machine 20 is comprised of a base or bed 22 supporting a workpiece table 31 which is reciprocally moveable by means of a second actuator 46 in the direction along one axis, indicated by the double-headed arrow labeled X, toward and away from a grinder table 23. The workpiece table 31 is supported for movement over the length of the base by first set of elongate bars 24 which are precisely aligned parallel to the axis of travel of the grinder table 23.

The grinder table 23 supports a grinder spindle 25 comprised of a prime mover (preferably a constant speed high speed motor) 26 coupled to a variable chuck mechanism 27 which holds a replaceable grinding bit 28 preferably made of "BORAZON" or like materials.

The grinder table also supports a supply conduit 29 which directs a stream of liquid coolant into the grinding operation to wash away waste material, shavings or particles of ground metal, and to cool and lubricate the grinding bit during the grinding operation. The pump which causes the coolant to flow from a suitable source to the conduit 29 is not shown in the figures. The grinder table 23 is reciprocally moveable along an axis, indicated by a double-headed arrow labeled as Y, which is precisely at right angle to the axis of travel of the workpiece 31 and includes a means to effect the movement of the grinder table along 23 its axis and a means to precisely measure the position of the grinder table 23 in relation to the position of the workpiece (preferably a stepper motor 37 and position readout 38).

The controlled movement of the grinder table 23 allows the machine to accommodate workpieces of a variety of sizes. The grinder table 23 is supported for movement over the width of the base by a second set of elongate bars 39 which are precisely aligned parallel to the axis of travel of the grinder table 23 and perpendicular to the axis of travel of the workpiece table 31. The second set of elongate bars 39 are attached to a sub-base 40 which is able to be positioned, with respect to base 22, in the same plane as the first set of elongate bars 24 or in a plane perpendicular to the first set of elongate bars 24. With the sub-base positioned in the same plane as the first set of elongate bars 24, the stepper motor 37 causes the movement of the grinder spindle 25 either front to back on the axis indicated by the double-headed arrow labeled Y. With the sub-base positioned in the plane perpendicular to the first set of elongate bars 24, the stepper motor 37 causes the movement of the grinder spindle 25 either up or down on the axis indicated by the double-headed arrow labeled Z. The exact cases for each particular movement will be explained in later paragraphs.

In another embodiment of this invention, the grinder table 23 is equipped for controlled simultaneous movement along both axis indicated by the double-headed arrows labeled Y and Z.

Figure 6:
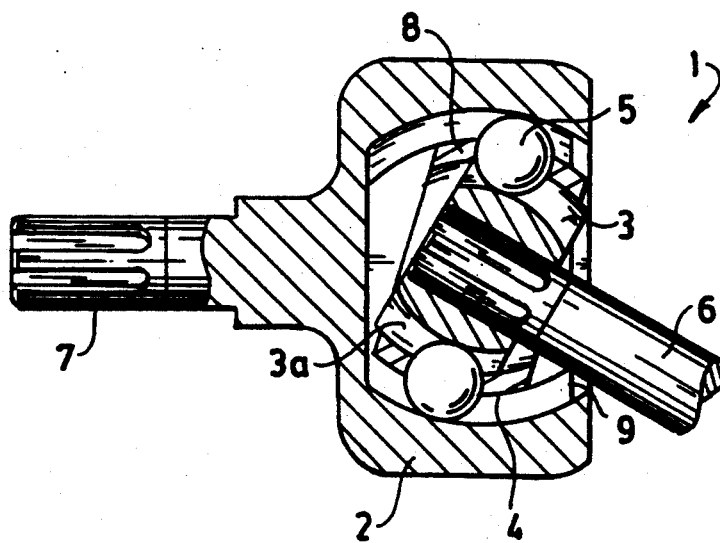
FIG. 6 is a cross-sectional view of a constant velocity universal joint.

The workpiece table 31 supports a rotatable arm 32 which includes a chuck mechanism 33. An adapter ring 41 is used to accommodate a variety of sizes of workpieces 36. A first actuator 42 rotates the chuck mechanism 33 and workpiece 36 about the centerline of the workpiece in a radius indicated by the double-headed arrow labeled S, to one of several precise axial positions, allowing the machine 20 to sequentially grind each of the several grooves 4 in the constant velocity joint 1 as shown in FIG. 6.

The rotatable arm 32 is moveable by third actuator 47 about a centerpoint of rotation 45 allowing the workpiece 36 to be moved through a radius, indicated by the double-headed arrow labeled R, in relationship to the grinding bit 28. Means to sense the radial position of the rotatable arm 32 and means to lock the radial position of the rotatable arm 32 in relationship to the position of the grinding bit 28 ar not shown in these figures but are discussed in later paragraphs.

Grinding station 17 is defined by the engagement of the grinder table 23 and the workpiece table 31.

In coordination with the microprocessor, a control unit (not represented pictorially) has been designed to send and receive signals to or from all, or practically all, of the moving parts of the grinding machine 20, such as the prime mover 26, the second actuator 46 for moving the workpiece table 31 towards or away from the grinding bit 28, the third actuator 47 for rotating the rotatable arm 32 about its center of rotation 45, the stepper motor 37 used to move the grinder table 23 from front to back or up and down, the actuator 42 used to increment the workpiece 36 to sequential positions about its center axis, and the means to pump coolant solution to the supply conduit (not represented pictorially).

By programming the control unit the pattern through which the workpiece 36 moves in relation to the replaceable grinding bit 28 will be automatically determined. When the grinding machine 20 is in use, the control unit transmits and receives a series of signals which cause the grinder table 23, grinder spindle 25 and replaceable grinding bit 28 to be moved along the Y and/or Z axis to the proper position, the rotatable arm 32 to be rotated to a starting position, the grinder motor 26 and cooling fluid pump (not represented pictorially) to be turned on, and the workpiece table 31 to advance toward the replaceable grinding bit 28 in a predetermined sequence and at predetermined intervals established by the particular type and size of constant velocity universal joint component being ground.

In the preferred embodiment the grinding machine is designed to automatically regrind any component of any constant velocity joint. As illustrated in FIG. 6, a constant velocity universal joint 1 is usually comprised of an outer enclosure or race 2 with an inner diameter larger than the outer diameter of an inner bearing member or race 3. Both the inner surface of the outer bearing race 2 and the outer surface of the inner bearing race 3 are manufactured with radial circular grooves 4 located around and parallel to the common axis of the inner member 3 and the outer enclosure 2 to receive ball bearings 5. Ball bearings 5 are sized to closely fit into the grooves 4 in the inner member 3 and outer enclosure 2, positioning the inner member and outer enclosure in relationship to each other in such a way as to permit the ball bearings 5 to roll forward and backward in the grooves 4 as the input shaft 6 is turned off axis to the output shaft 7 to prevent vertical or horizontal motion of the ball bearings 5 relative to the axis of the grooves 4. The bearing assembly is protected by a boot 9, made of rubber or the like, tightly affixed to the outer surface of the constant velocity universal joint and output shaft 7.

To facilitate assembly and disassembly of the constant velocity universal joint, the ball bearings 5 are contained in an intermediate bearing retainer 8. The outer enclosure 2 is typically connected to the front wheel components by means of a splined trunion. Similarly, the inner member 3 of the universal joint is typically coupled to the vehicle transmission output by means of a splined receptacle. Assembled, the components of the constant velocity universal joint constitute a sliding joint which accommodates vertical and horizontal misalignment between the vehicle transmission and the front wheel drive components and permit the turning of the front wheels for steering.

As illustrated in FIGS. 7, 8, 9, and 19, there are several different kinds of constant velocity universal joints, usually used at the transmission end of the half-axles, whose individual internal components can be ground on the grinding machine of this invention.

Figure 7:
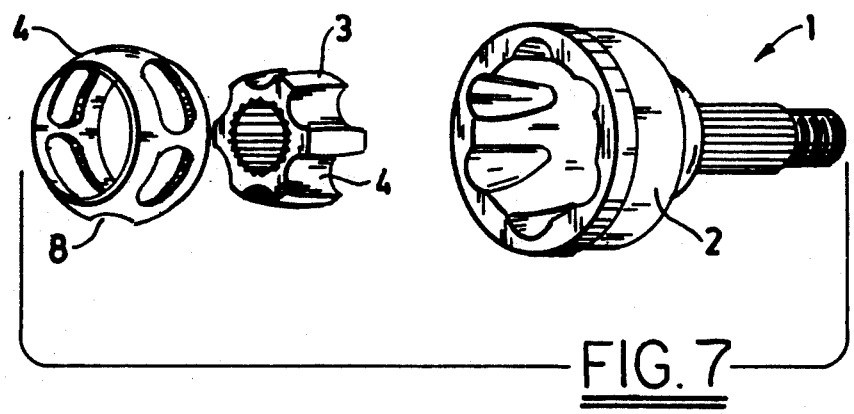
FIG. 7 is an exploded view of an Rzeppa type constant velocity universal joint.
Figure 8:
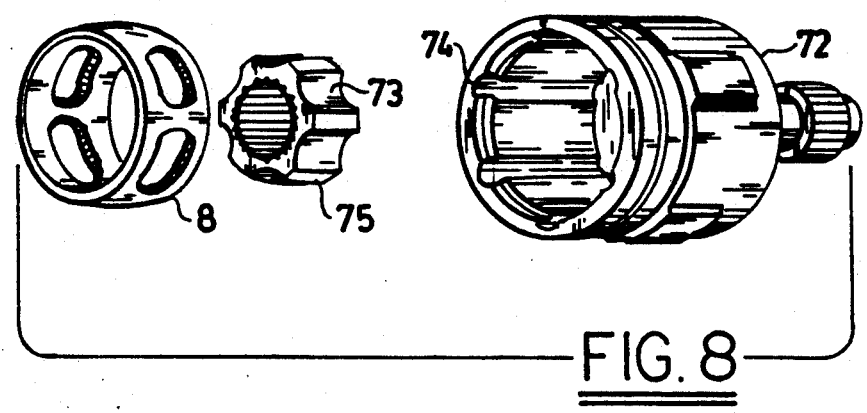
FIG. 8 is an exploded view of an inline type constant velocity universal plunge joint.
Figure 9:
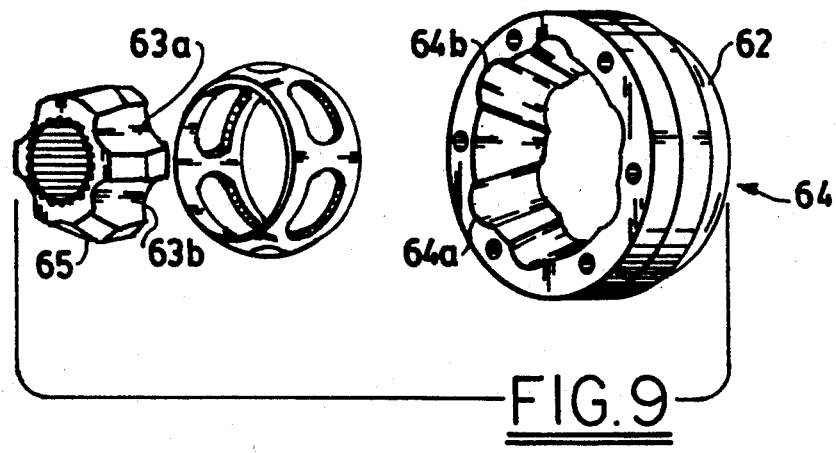
FIG. 9 is an exploded view of a skewed groove type constant velocity universal plunge joint.
Figure 18:
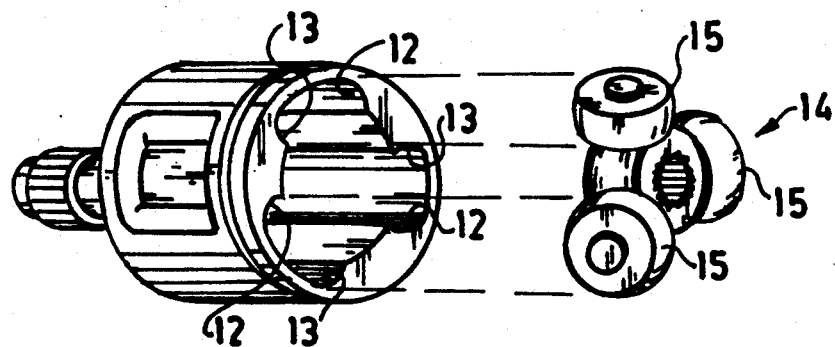
FIG. 18 is an exploded view of a tripod type constant velocity universal plunge joint.

FIG. 7 illustrates a Rzeppa type constant velocity universal joint. FIG. 8 illustrates an In Line type constant velocity joint. FIG. 9 illustrates a constant velocity universal joint referred to as skewed groove disk type. In this type of constant velocity universal joint, the outer race disk 62 contains the grooves 64. Three of the grooves 64a are skewed clockwise; the other three grooves 64b are skewed counterclockwise. The grooves 4 do not have a radius of curvature as those grooves 4 in the housing of constant velocity universal joint of FIG. 6. The inner ball race 65 is similar to that of the constant velocity universal joint of FIG. 6 except the grooves 63 are angled clockwise and counterclockwise as in the outer housing. In addition FIG. 18 illustrates yet another type of constant velocity joints, i.e., the Tripod type.

Figure 4:
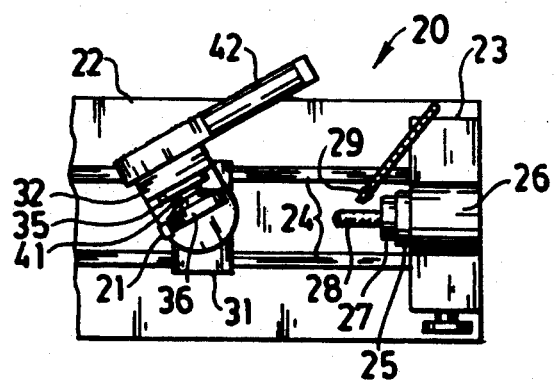
FIG. 4 is a top planar view of the workpiece table and the grinder table.

With these various types of constant velocity joints in mind, the following will discuss how the grinding machine of this invention can grind all the components of any constant velocity joint. Now, referring to the grinding machine as illustrated in FIGS. 2, 3 and 4, the procedure for grinding a typical outer race is as follows, using a Rzeppa type constant velocity joint as an example.

Figure 22:
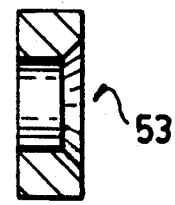
FIG. 22 is a sectional view of the outer race spacer.

When the grinding machine 20 is in use grinding the components of an Rzeppa type constant velocity joint similar to that shown in FIGS. 7, the outer enclosure or race 2 of the constant velocity universal joint 1 is inserted into the chuck mechanism 33, using the appropriate workpiece adapter 41 for the type and size constant velocity universal joint enclosure, to properly position the enclosure 2 so that the center of the radius of the grooves 4 is directly and precisely over the center of rotation 45 of the chuck mechanism 33. Outer race spacer 53 (shown in FIG. 22) is the preferred workpiece adapter for this component. The chuck mechanism 33 is loosely closed around the workpiece adapter and the outer enclosure 2 to permit the turning of the outer enclosure in the chuck mechanism. A dial indicator which is not shown or other means is then used to locate and position the central axis of one of the grooves 4 in the outer enclosure 2 to be precisely aligned with the center of the grinding bit 28 along the Z axis as the outer enclosure 2 is turned in the loosened chuck mechanism 33. The chuck mechanism 33 is tightened to enable the grinding operation to begin.

Figure 10:
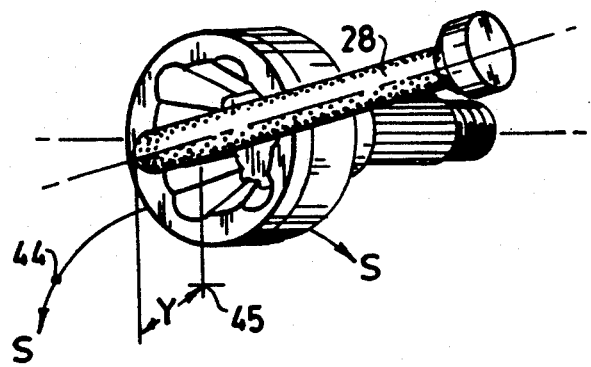
FIG. 10 is a schematic perspective view of the workpiece holder, workpiece and grinding bit with the outer race component of the Rzeppa type constant velocity joint mounted for grinding shown in the starting position.
Figure 11:
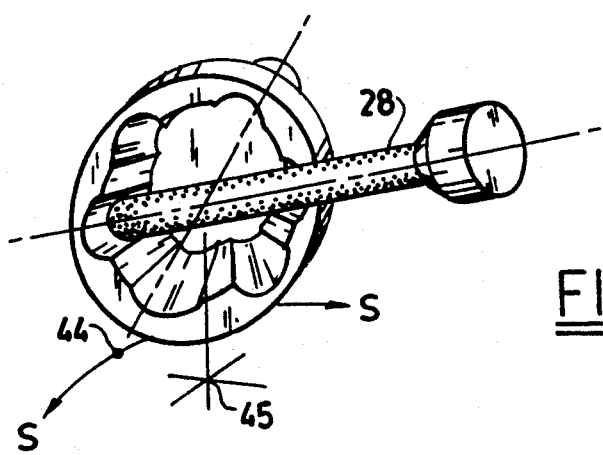
FIG. 11 is a schematic perspective view of the workpiece holder, workpiece and grinding bit wtih the outer race component of the Rzeppa type constant velocity joint mounted for grinding shown midway through the grinding process.
Figure 12:
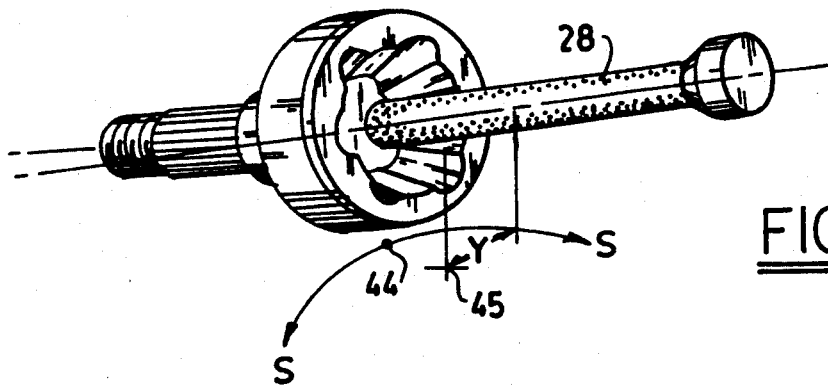
FIG. 12 is a schematic perspective view of the workpiece holder, workpiece and grinding bit with the outer race component of the Rzeppa type constant velocity joint mounted for grinding shown at the innermost position.

Referring once again to FIGS. 2 and 7, depending on the type and size of the Rzeppa type constant velocity universal joint component being ground, a replaceable grinding bit 28 with a diameter equal to the diameter of the replacement ball bearings to be used in rebuilding and a length (LL) equal to the distance measured from the grinder chuck 27 to the tip of the spherical grinding bit 28 is securely mounted in the adjustable grinder chuck mechanism 27. The moveable table 31 holding the outer enclosure 2 is moved along the axis, indicated by double-headed arrows (X), and rotated about the center of rotation indicated by double-headed arrows (R) to position the outer enclosure 2 at a point at which the tip of the grinding bit 28 is at the position which will grind the proper depth into the outer enclosure 2 when the outer enclosure is rotated around the tip of the grinder bit 28. Upon initiation of the automatic grinding sequence regulated by the control unit, the position of the outer enclosure is automatically rotated slowly around the center of rotation 45 with the grinding bit 28 rotating at high speed until the grinding bit 28 has traveled forward and back through a given arc into the grooves 4 of the outer enclosure 2 and returned to its starting position with the tip of the grinding bit in front of the outer enclosure 2. The process is illustrated by FIGS. 10, 11, and 12. The control unit then transmits a signal to the chuck mechanism 33 to increment the position of the outer enclosure 2 about the center axis of the workpiece as indicated by double-headed arrows (S) until the next groove 4 of the outer enclosure 2 is sequentially placed into position engaging the grinding bit 28. The grinding sequence is repeated until all grooves 4 have been ground identically.

Figure 13:
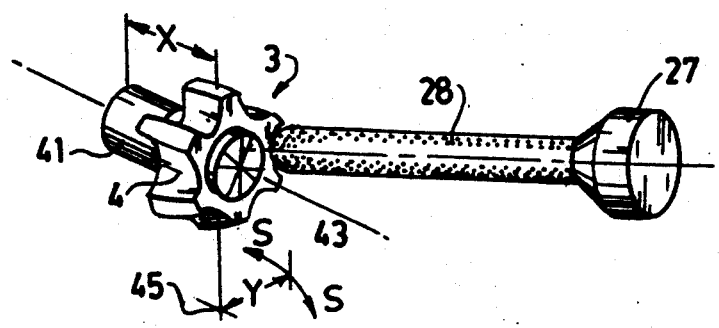
FIG. 13 is a schematic perspective view of the workpiece holder, workpiece and grinding bit with the inner race component of the Rzeppa type constant velocity joint mounted for grinding shown in the starting position.
Figure 23:
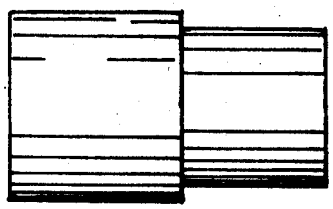
FIG. 23 is a plan view of the inner race spacer.
Figure 24:
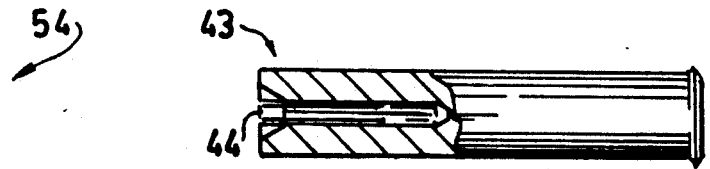
FIG. 24 is a view of the inner race expanding mandrel.

Once the outer race is completed the inner race can be ground. Referring now to FIGS. 2, 3, and 13, the process for grinding of the grooves in the inner race 3 is disclosed. The inner member or bearing race 3 is inserted into the chuck mechanism 33, using the appropriate workpiece adapter 4 with an expanding mandrel 43 for the type and size constant velocity joint, to properly position the center of rotation of the inner race 3 directly and precisely over the center of rotation 45 for the rotatable arm during the grinding operation. The expanding mandrel is tightly adjusted to lock the workpiece to the adapter. In the preferred embodiment the adapter is configured as illustrated in FIG. 23 as inner race spacer 54 which is attached to the expanding mandrel and the chuck mechanism. The preferred expanding mandrel is designed as shown in FIG. 24 to be a slotted mandrel 43 with expansion screws 44 operating within. With the preferred adapter fixed to the workpiece the chuck mechanism 33 is then loosely closed around the workpiece adapter and the inner race 3 to permit the rotation of the workpiece adapter with the inner race in the chuck mechanism. A dial indicator which is not shown, or other means is used to locate and position the central axis of one of the grooves 4 of the inner race 3 to be precisely aligned with the centerline of the grinding bit 28 along the Z axis as the inner race 3 is turned in the loosened chuck mechanism 33. The chuck mechanism 33 is tightened to enable the grinding operation to begin. The position of the grinding tip along the Y axis is adjusted to place the tip of the grinding bit 28 at the proper position so as to remove a known amount of material from the surface of the groove 4 as the workpiece is rotated by the rotatable arm 32. Upon completion of grinding a groove, the control unit then transmits a signal to the chuck mechanism 33 to increment the position of the workpiece about the center axis of the workpiece as indicated by the double-headed arrows (S) until the next groove 4 of the inner race 3 is sequentially placed into position for engaging the grinding bit 28. The grinding sequence is repeated until all grooves have been ground identically.

Empirical tests have shown that with the grinding bit sized properly, very precise control of the grinding operation is obtained to a tolerance of plus or minus one thousandth of an inch.

Furthermore, it has been found that if the inner race is not ground to a specific tolerance the constant velocity joint may seize under normal working conditions. In order to prevent seizing the drill bit should be five ten-thousandths of an inch greater than the size of the new ball bearing's diameter. Moreover the new ball bearing's diameter should be two one-hundredths of an inch greater than the size of the original inner race grooves. These tolerances produce the appropriate clearances allowing the ball to actually move and not seize in the inner race groove.

Figure 5:
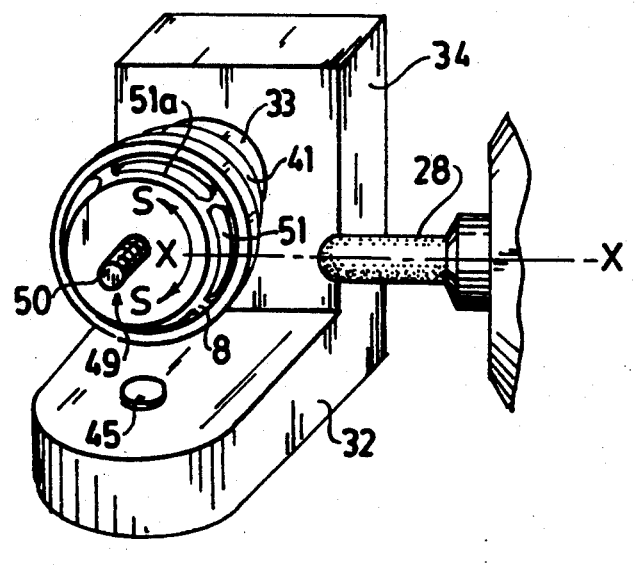
FIG. 5 is a schematic perspective view of the workpiece holder, workpiece and grinding bit with the cage component of the constant velocity joint mounted for grinding.
Figure 21:
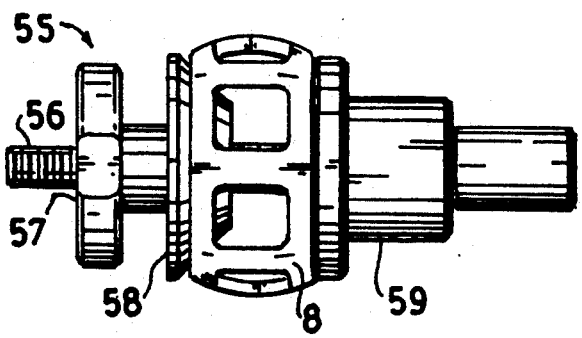
FIG. 21 is a plan view of the cage adapter assembly.

Referring now to FIG. 5, the process for grinding the bearing cage or intermediate bearing retainer 8 is disclosed. The bearing cage 8 is mounted in the chuck mechanism 33 by use of an appropriate workpiece adapter 41. A bearing cage adapter cover plate 49 is turned onto a threaded concentric shaft 50 to clamp the bearing cage 8 tightly between the adapter 41 and the cover plate 49. The chuck mechanism 33 is loosely closed around the workpiece adapter 41 and the bearing cage 8 to permit the rotation of the workpiece adapter 41 and bearing cage 8 in chuck mechanism. In the preferred embodiment the adapter is cage adapter assembly 55 (shown in FIG. 21). As FIG. 21 illustrates the cage adapter assembly includes adapter body 59 which sticks into the chuck mechanism at one end and bearing cage 8 at the other. The bearing cage is sandwiched by the adapter body and cone 58. Fast-lock knob 57 secures screw 56 through the cone, bearing cage and adapter body into the chuck mechanism.

As illustrated in FIG. 5, the rotatable arm 32 positioned perpendicular to the central axis of the grinding bit 28, a dial indicator which is not shown, or other means is used to locate and position the center of one of the openings 51 of the bearing cage 8 to be precisely aligned with the centerline of the grinding bit 28 along the Y and Z axis as the bearing cage 8 is turned in the loosened chuck mechanism 33. The chuck mechanism 33 is tightened to enable the grinding operation to begin. The position of the workpiece table 31 is advanced slowly toward the grinding bit 28 until the grinding bit has penetrated the opening 51 in the bearing cage 8. The position of the grinding bit along the Z axis is then adjusted to move the grinding bit 28 up and down along the Z axis to grind both sides of the rectangular opening 51 in the bearing cage 8. When the grinding operation has been completed, the workpiece table 31 is moved away from the grinding bit 28, the chuck is incremented to position the next opening 51a inline with the grinding bit 28 and the operation is repeated until each of the openings has been ground.

Once all grinding operations are complete, the inner race 3, outer race 2, ball bearings 5, bearing cage 8 and rubber boot 9 (shown in FIG. 6) are then reassembled in the manner of the original constant velocity universal joint.

Figure 16:
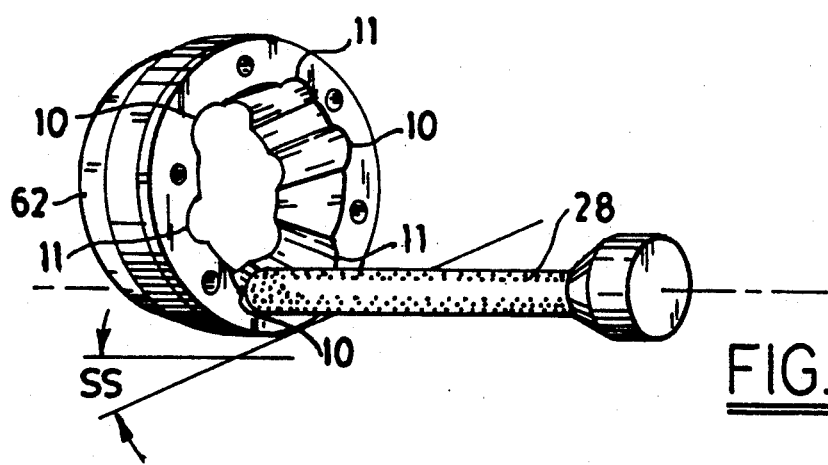
FIG. 16 is a schematic perspective view of the Workpiece holder, workpiece and grinding bit with the outer race component of the skewed groove type constant velocity plunge joint mounted for grinding shown with the grinding bit in the starting position for the right skewed groove.
Figure 17:
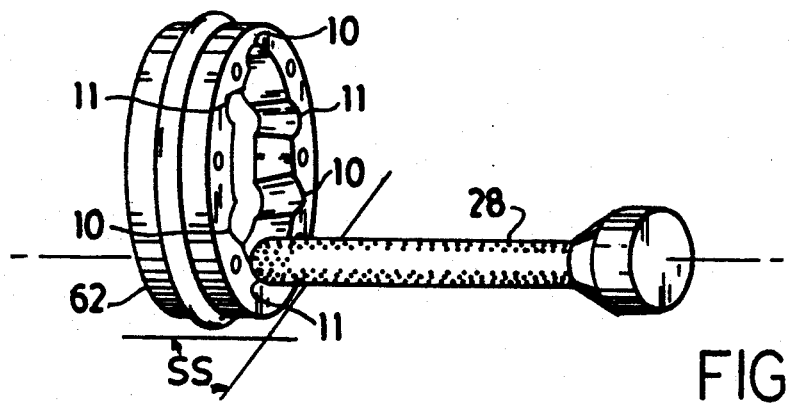
FIG. 17 is a schematic perspective view of the workpiece holder, workpiece and grinding bit with the outer race component of the skewed groove type constant velocity plunge joint mounted for grinding shown with the grinding bit in the starting position for the left skewed groove.

The above discussion of grinding procedures relates to typical constant velocity joints, however with certain constant velocity joints special grinding procedures must be initiated. Based on the data inputted by the grinding machine operator these special procedures will be relayed to the grinding machine through the microprocessor and the control unit. For example, in order to enable grinding of the internal components of the skewed groove type of constant velocity universal joint, as shown in FIGS. 16 and 17, the grinding machine 20 of FIG. 2 is modified to include a means to lock the rotatable arm 32 carrying the specific constant velocity universal joint 25 in two positions to effectuate grinding. The locking means first sets the rotatable arm in a first position wherein the clockwise grooves 64a are precisely aligned to the centerline of the grinding bit 28 along the Y axis. In the second position, the locking means sets the rotatable arm counterclockwise with the grooves 64b precisely aligned to the centerline to the grinding bit 28 along the Y axis. The locking means comprise a pneumatically operated solenoid which is not shown in the figures, located beneath the rotatable arm 31 which, when operated, causes a tapered pin to be forced into one of several precisely located receptacles on the underside of the rotatable arm; an electrical position sensing device such as a roller operated electrical switch, also not shown, senses both the motion and the relative position of the rotatable arm and transmits signals to the control device.

The process for grinding this type of constant velocity universal joint is further modified somewhat from that described above. It is necessary to first align the grinding bit 28 at a position corresponding to the top center of the outer housing 62. The rotatable arm 32 is then moved to the first position, locked in place, with the clockwise grooves 64a precisely in line with the grinding bit 28. The outer housing 62 is then advanced to the grinding bit 28, and slowly advanced forward to allow the grinding bit 28 to grind the first clockwise groove 64a. The rotatable arm 32 does not rotate during the grinding operation. Upon completion of regrinding the first groove 64a, the outer housing 62 is moved away from the grinding bit 28, turned one hundred twenty degrees to the next clockwise groove. This sequence is followed until all three clockwise grooves 64a have been ground to within specification.

The outer housing 62 is then moved away from the grinding bit 28, and the rotatable ar 32 is moved into the second position with the counterclockwise grooves 64b precisely in line with the grinding bit 28. The grinding operation is repeated until each counterclockwise groove 64b is reground. The inner bearing race 65 is similarly reground following this procedure.

Figure 14:
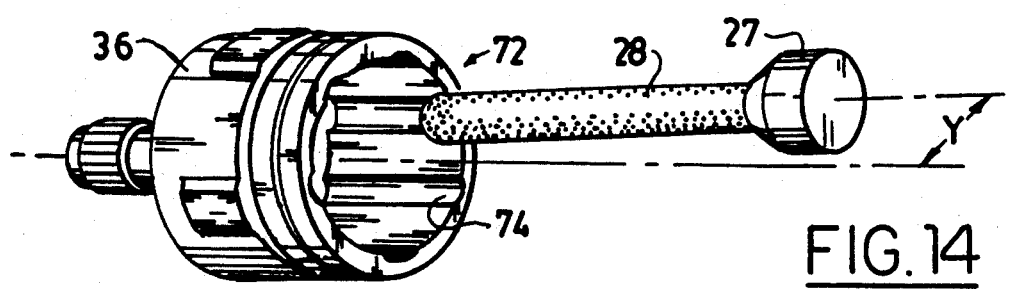
FIG. 14 is a schematic perspective view of the workpiece holder, workpiece and grinding bit with the outer race component of the inline type constant velocity plunge joint mounted for grinding shown in the starting position.
Figure 15:
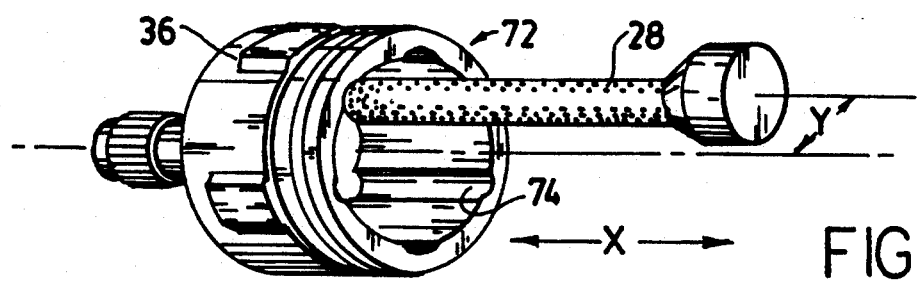
FIG. 15 is a schematic perspective view of the workpiece holder, workpiece and grinding bit with the outer race component of the inline type constant velocity plunge joint mounted for grinding shown at the innermost position.

Another type of constant velocity joint on which the regrinding machine 20 of FIG. 2 will operate is known as a In-Line, shown in FIG. 8. This type of constant velocity universal joint is similar to the constant velocity joint illustrated in FIG. 6 except that there is no radius of curvature in the grooves. As illustrated in FIGS. 14 and 15, in order to regrind the components of this type constant velocity universal joint, the rotatable arm 32 is moved into engagement with the workpiece, either an outer housing 72, inner race 75 or cage 8, locked in place, with the grooves 74 precisely in line with the grinding bit 28. The workpiece is then advanced to the grinding bit 28, and slowly advanced forward to allow the grinding bit 28 to regrind each groove 74 in similar fashion to the constant velocity universal joint of FIG. 6 except the rotatable arm 32 does not rotate during the grinding operation.

By changing the workpiece adapter 41 with which the workpiece is held in the chuck mechanism 33 and repositioning the grinding bit 28 in relationship to the workpiece, the inner ball race 3, 65, and 75 for each constant velocity universal joint type can be ground using the same size grinding bit used on the outer housing 2, 62, and 72.

Figure 19:
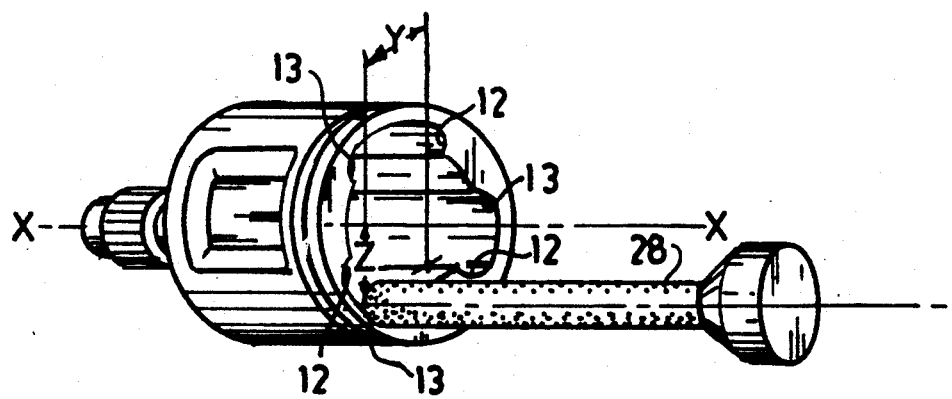
FIG. 19 is a schematic perspective view of the workpiece holder, workpiece and grinding bit with the outer race component of the tripod type constant velocity plunge joint mounted for grinding shown with the grinding bit in the starting position for the right side of the roller bearing groove.
Figure 20:
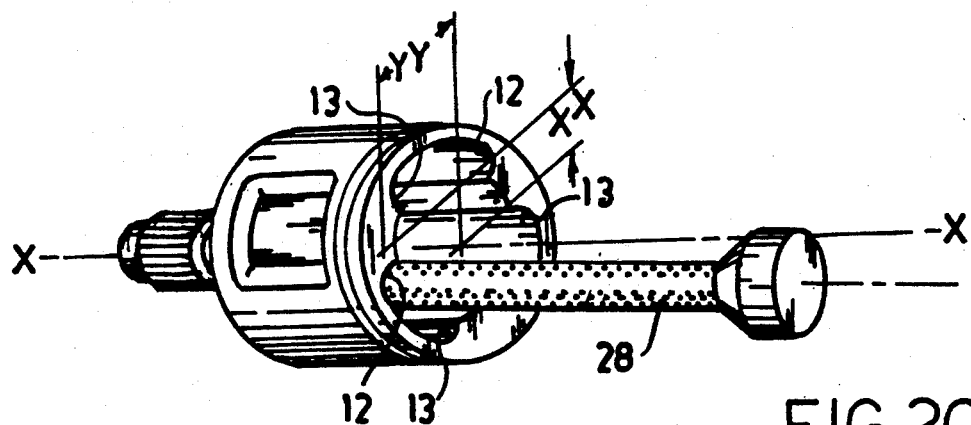
FIG. 20 is a schematic perspective view of the workpiece holder, workpiece and grinding bit with the outer race component of the tripod type constant velocity plunge joint mounted for grinding shown with the grinding bit in the starting position for the left side of the roller bearing grove.

Similarly, the grinding machine of this invention, and the methods of regrinding, can be modified as illustrated in FIGS. 19 and 20 in order to accommodate precision grinding of the tripod type constant velocity universal joint component shown in FIG. 18.

An additional feature of the grinding machine of FIGS. 2 and 3 is that it is comprised of a means to compensate for grinding bit 28 deterioration through use and wear. As each successive groove is ground, the grinding bit is worn away. The length of the grinding bit will affect the depth of regrinding. T compensate for a change in the length of the grinding bit 28, the position of the grinding bit 28 must be adjusted relative to the workpiece. Before the grinding operation begins, the appropriate grinding bit 28 is inserted loosely into the grinder chuck 27 The workpiece table 31 is positioned in relationship to the grinding bit 28 with a reference surface 21 on the platform 31 oriented toward the grinding bit 28. The grinding bit 28 is pulled out of the grinder chuck mechanism 27 until it is solidly against the reference surface 31. The grinder chuck mechanism 27 holding the grinding bit 28 is then tightened.

In the machining of the original constant velocity joint a keyway is built into the stock of the workpiece. The keyway facilitates in aligning and centering the workpiece. Once the initial grinding has been completed the keyway is ground off. Thus in the regrinding procedures there exists a need for an alternative means of aligning and centering the workpiece in the grinding machine.

Figure 25:
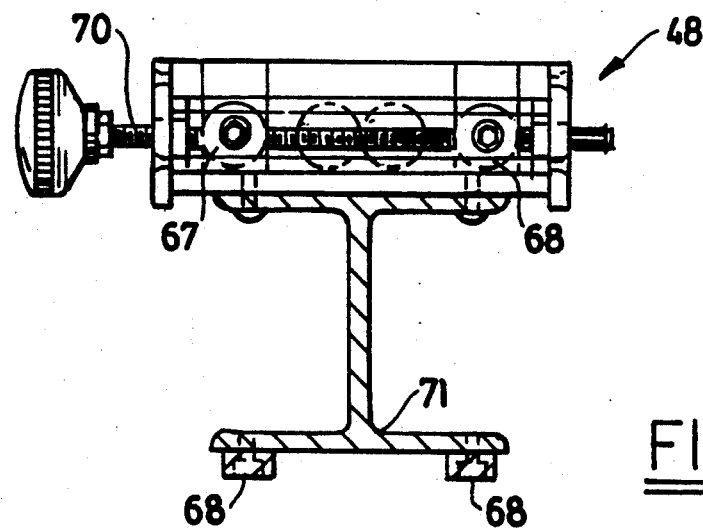
FIG. 25 is a view of the horizontal alignment adapter.

In the preferred embodiment of this invention there is a means to accurately adjust the horizontal position of the workpiece in the workpiece chuck. This means is illustrated in FIG. 25. Horizontal alignment adapter 48 consists of right hand slide nut 67 and left hand slide nut 68, both of a size appropriate for the particular constant velocity joint size. The slide nuts are welded to screw shaft 70. Foot-plate 70 is secured by jig rest buttons 69 which are positioned within corresponding holes located in the steel tooling plate of the rotatable arm of the grinding machine. This positioning causes the horizontal alignment adapter to align along the horizontal plane. Since the axis of the screw shaft is parallel to the foot-plate the workpiece will then be aligned along a horizontal centerline parallel to the rotatable arm plate. Actual centering of the outer race occurs by turning the screw shaft which advances the right hand slide nut and left hand slide nut away from the center of the screw shaft and into the inner diameter of the outer race. A signal from the control unit causes the workpiece chuck mechanism 33 to articulate to the next groove position. The workpiece rotates in the chuck mechanism 33 until the horizontal alignment adapter 48 pushes into the next groove holding the constant velocity universal joint component then in horizontal alignment. The workpiece chuck mechanism 33 is then tightened. The workpiece is then moved back to permit the alignment tool 48 to be replaced with the appropriate sized grinding bit 28. The horizontal alignment of the inner race is a similar procedure except that the right hand slide nut and the left hand slide nut contact the outer diameter grooves of the inner race.

In the preferred embodiment horizontal alignment is necessary because grinding is always done on the horizontal plane however alternate embodiments may require grinding on a vertical plane and so a means for vertical alignment similar to the means for horizontal alignment would be required. A vertical alignment adapter could be designed similar to the horizontal alignment adapter with the exception that the screw shaft would be mounted perpendicular to the foot-plate instead of parallel.

While the grinding machine 20 has been shown and described for use with constant velocity universal joints, it is to be understood that the machine of present invention is equally applicable to other workpieces where precisely controlled, accurate grinding is needed.

Figure 26:
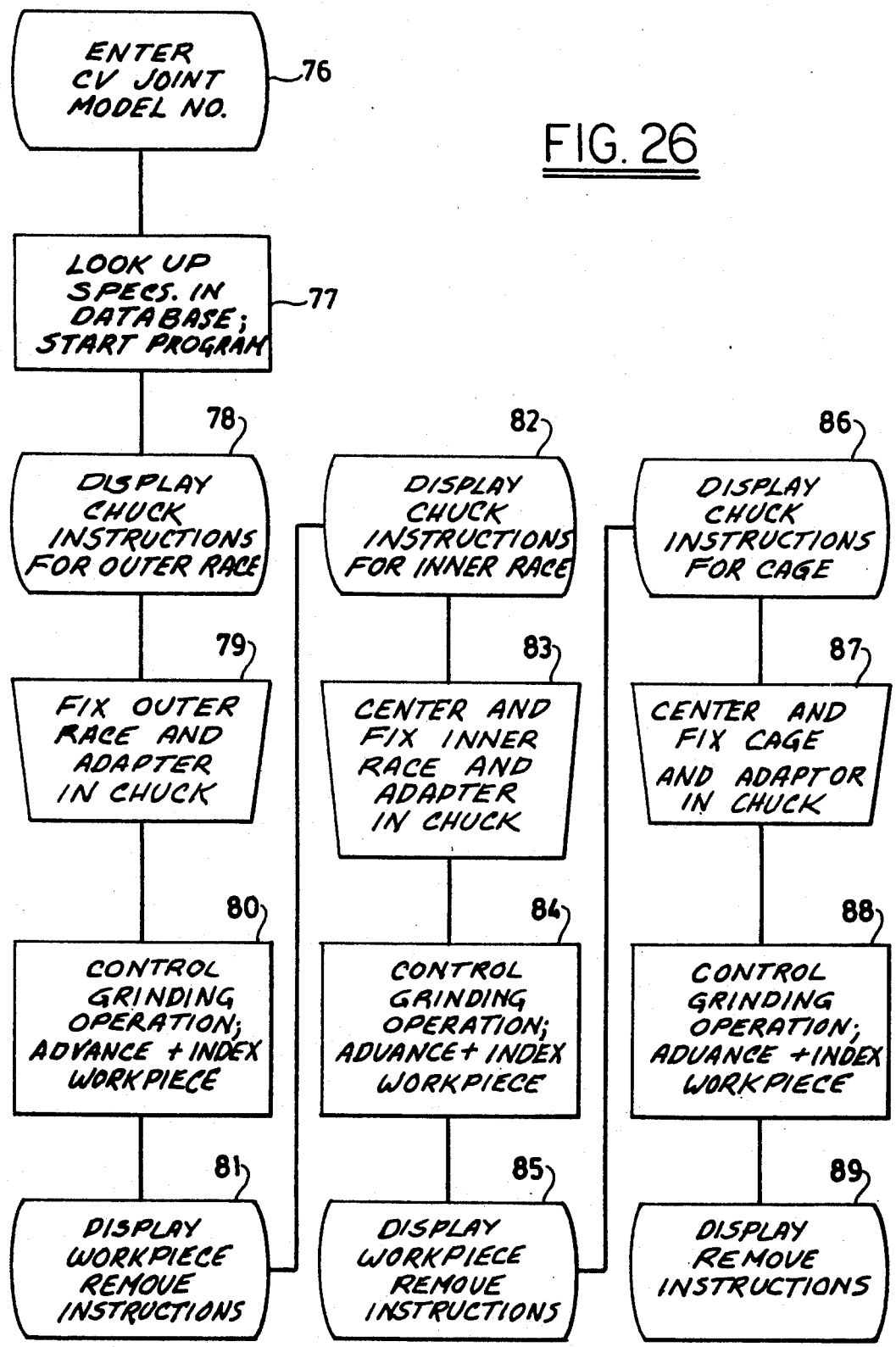
FIG. 26 is a flow chart of the computer controlled operations according to the method for regrinding a workpiece.

The controlled process to which the machine of this invention is put to use is illustrated in FIG. 26. This process is enabled by a microprocessor and sequential programming appropriate to the workpiece being ground based on an extensively compiled database of specifications for regrinding the wide variety of joint configurations according to the many manufacturers, model and year of cars from which they are removed for repair.

As the data entry block 76 illustrates initially, the machine operator must enter model number information on the joint to be remanufactured into the controlling computer via keyboard. In the preferred embodiment this is an interactive procedure by which the microprocessor screen displays a series of questions, and using the keypad the machine operator responds accordingly. Typical questions involve entering the manufacturer of the workpiece, the model type and year, and sizing.

Based on the responses the dimensions and other specifications of the particular joint to be operated upon are looked up in the database stored on appropriate computer memory media, and the proper program for grinding the workpiece is selected in microprocessor operation 77. The CRT display screen or other appropriate display medium will instruct the operator in display operation 78 for chucking the outer race component in the chuck on the rotatable table, and the manual operation 79 must then be completed. Operating control function 80 will then detect the workpiece in position and enclosure locked, and the grinding operation rotational movement will be entirely controlled and directed by the preprogrammed instructions from the microprocessor according to the specifics of the workpiece dimensions, both controlling movement of the rotating table and chuck and thus the workpiece into the grinding bit, and further indexing the workpiece to position each groove in relation to the bit for sequential grinding operations until the entire part and all the grooves have been worked. At completion, display operation 81 instructs the operator to remove the workpiece, and a similar operational sequence 82–85 is repeated for the inner race component and again a similar operational sequence 86–89 for the cage component.

Thus, the computer program automatically provides complete control and instructions according to the specific dimensions of any selected joint, and precisely accomplishes the regrinding operations of each of the 3 major components by rotating the workpiece holder through the predetermined pattern of movement which grinds the grooves of the workpiece. Grinding is preferably controlled within a tolerance of at least about +/− three thousandths of an inch.

The present invention is not limited to the procedures as set forth above. The grinding machine has been designed to be programmed to operate on various size and shape workpieces, and as such, the process for grinding a specific component may deviate from that which was discussed above while still retaining the essence of the invention which enables the entire remanufacturing operation.

We claim:

1. A machine for regrinding a component part of a constant velocity universal joint, said constant velocity universal joint having ball bearings, an outer housing with an outer ball race member and an inner ball race member, said members provided with curved ball receiving grooves, and a ball cage between said members having ball containing grooves, comprising:

(a) means for holding said component part, comprising a chuck mechanism and an adaptor for mounting said component in said chuck mechanism;

a grinding bit comprised of a grinding tip, wherein said grinding tip comprises boron nitride;

(c) rotatable support means for supporting said chuck mechanism, wherein said rotatable support means is comprised of means for disposing said component part so that at least one surface of said component part contacts said grinding tip of said grinding bit in such a manner that said tip contacts said surface at a specified angle of incidence;

(d) means for rotating said rotatable support means in order to change said angle of incidence between said grinding tip and said surface of said component part;

(e) a motorized grinding tool comprised of said grinding bit, wherein said grinding bit has a head larger than the diameter of the original ball bearings;

(f) means for adjusting the position of said motorized grinding tool in the Z axis to move said motorized grinding tool up and down;

(g) means for adjusting the position of said motorized grinding tool in the Y axis to move said grinding tool in and out;

(h) a lubricating fluid injection system for lubricating said component part and said grinding tool during the grinding operations; and (i) a protective enclosure surrounding the grinding machine components for containing lubricating fluid during grinding operations.

* * * * *